Patented Feb. 28, 1928.

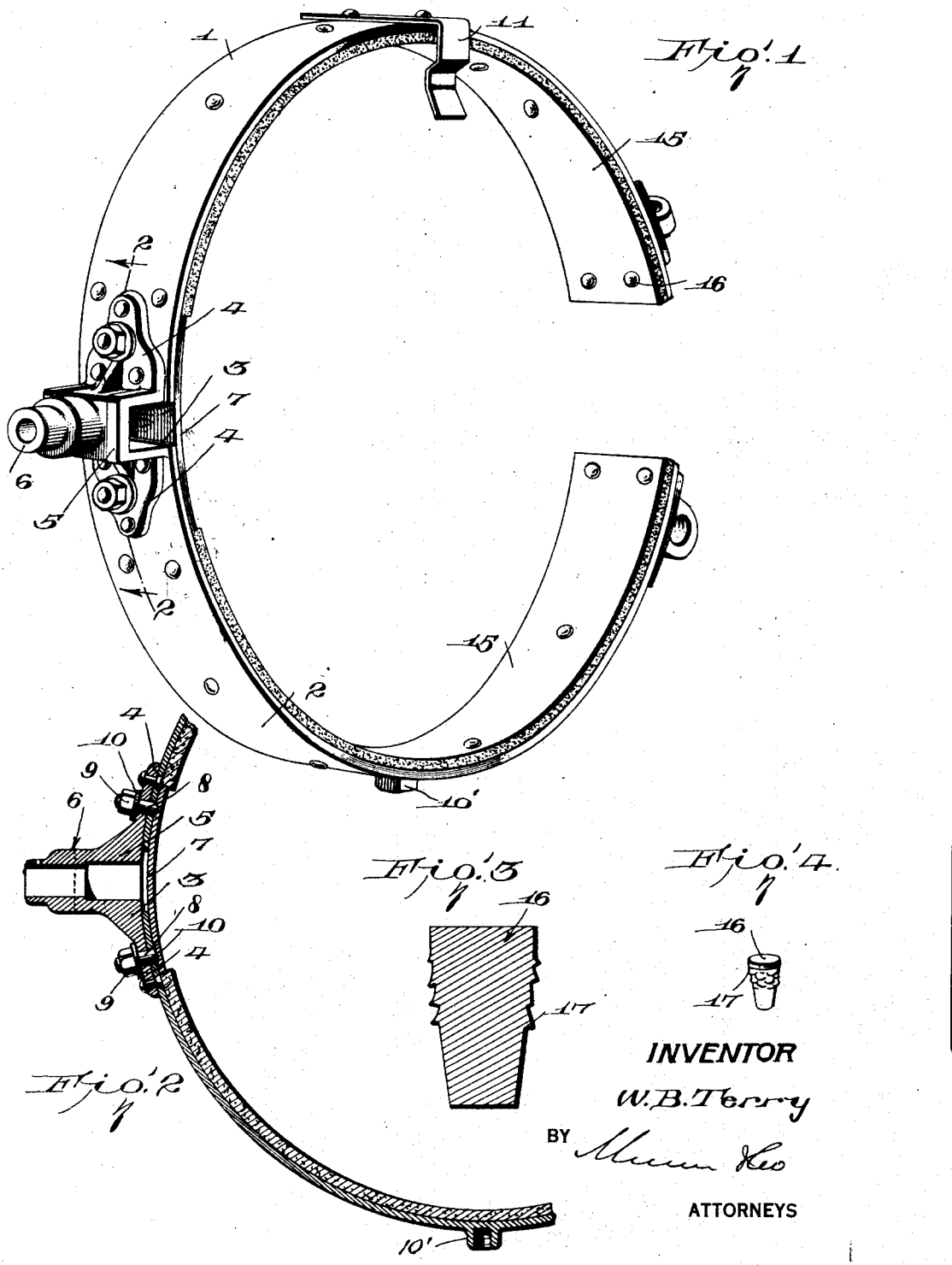

1,661,057

UNITED STATES PATENT OFFICE.

WILLARD B. TERRY, OF SALT LAKE CITY, UTAH.

BRAKE BAND AND LINING THEREFOR.

Application filed September 15, 1926. Serial No. 135,665.

This invention relates to an improved brake band and lining therefor, and has for one of its principal objects the provision of a device of this character wherein the lining may be applied to and removed from the band without the necessity of the band and the operating mechanism of the brake being disassembled and taken from the wheel. If this cannot be done, that is, if the lining is difficult to remove from the band, then the band may be taken from the drum and replaced therein with a new lining without removing the wheel.

A further object is to provide a novel means for securing the lining to the band in such a manner as to avoid squeaks and undesirable noises and also avoid scoring of the brake drums.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a brake band and lining embodying the present invention, Figure 2 is a fragmentary sectional view taken in the plane of line 2—2 of Figure 1, Figure 3 is a detail sectional view of one of the aluminum rivets, and Figure 4 is a detail perspective view thereof.

Referring to the drawings it will be seen that the brake band is made up of a pair of similar sections 1 and 2. The sections at one end are united by means of a bracket 3 having attaching portions 4 riveted to the sections 1 and 2 of the band and having a U-shaped body portion 5 extending outwardly from the attaching portions 3 and 4 and integrally formed with an apertured boss 6 designed to co-act with one of the rear brake supports (not shown). A reinforcing plate 7 is provided between the ends of the sections 1 and 2 associated with the bracket 3, this plate 7 being constructed of sheet steel, thinner than the lining during its entire operative life, and being secured to the ends of the sections 1 and 2 by bolts 8 welded or otherwise suitably connected to the plate 7 and extending through openings provided therefor in the attaching portions 4 of the bracket 3. Nuts 9 and washers 10 serve to secure the bolts 8 to the attaching portions 4 of the bracket 3. The ends of the sections 1 and 2 of the band opposite those connected with the bracket 3 are provided with the usual means adapting them for co-action with the operating mechanism for the brake.

A nut 10' is welded to the section 2 of the brake band and is adapted to co-act with an adjusting bolt of a lower brake support or mounting (not shown). The other section 1 of the brake band has a mounting strip 11 riveted thereto and adapted to co-act with the brake housing to keep the band from lateral displacement.

The sections 1 and 2 are provided with linings 15, the linings being secured to the sections of the band by rivets 16. The rivets 16 are shown in detail in Figures 3 and 4 and are constructed entirely of aluminum, the periphery of the rivets tapering from one end to the other end as shown in the drawing. Adjacent their large ends the rivets have struck-out portions forming teeth or lips 17.

In applying the brake lining constructed in accordance with the present invention the brake band is loosened up and the old lining removed therefrom, after which the new lining may be applied while the band is on the drum. The rivets 16 are then driven into openings provided in the linings, the teeth 17 biting into the material of the lining and holding the rivets 16 in position. Preferably the openings in the linings are slightly less in diameter than the rivets. Countersinking is not necessary with the soft aluminum rivets. With the rivets assembled with the linings, the linings are inserted between the band and the drum and may be easily aligned with the openings in the band due to the fact that the small ends of the rivets are nearest to the openings of the band. When the rivets have been aligned with the openings of the band the band is tightened on the drum and this brings the rivets out through the openings of the band. They may then be hammered over to secure them in position since at such time the drum acts as an anvil. To remove the lining so applied it is only necessary to loosen up the brake mechanism and insert shims between the lining of the drum on each side of each rivet, whereupon the rivets may be easily punched from the band and lining.

If the lining is difficult to remove from the band the band may be taken off of the drum without removing the wheel by disconnecting the band from its supports, releasing it from its operating mechanism, and pulling it rearwardly from the drum after having taken off the reinforcing plate 7.

I claim:—

1. A brake band having openings, a lining therefor, and tapered rivets carried by the lining and having their small ends inserted through openings in the bands, the portions of the rivets imbedded in the lining having lips struck therefrom and biting into the lining.

2. A brake band including a pair of sections, a bracket connecting spaced ends of the sections, a reinforcing plate overlapping the inner faces of the ends of the sections connected by the bracket, and releasable means for securing the reinforcing plate to the bracket.

3. A brake band having a nut welded thereto and adapted to co-act with the mounting means.

WILLARD B. TERRY.